July 6, 1948.  S. A. HASTINGS ET AL  2,444,699

ROLL-NECK SEAL

Filed Aug. 16, 1946

INVENTORS
Shirrel A. Hastings
Charles F. Vojtech
BY

Charles F. Vojtech
Atty.

Patented July 6, 1948

2,444,699

UNITED STATES PATENT OFFICE 2,444,699

ROLL-NECK SEAL

Shirrel A. Hastings and Charles F. Voytech, Chicago, Ill., assignors to Crane Packing Company, Chicago, Ill., a corporation of Illinois Application August 16, 1946, Serial No. 690,846

5 Claims. (Cl. 286—11)

1

This invention relates to rotary seals and particularly to such seals which are adapted to effect a seal between two relatively rotatable vertically disposed surfaces. For purposes of illustration, this invention will be described with reference to its application to large seals such as are used for protecting the bearings of a rolling mill.

The principal object of this invention is to provide a large diameter seal which will have a relatively simple and inexpensive flexible sealing member but which nevertheless will seal upon a radial face.

Another object of this invention is to provide a seal for a roll neck or the like wherein the seal is readily removed from the roll without destroying any of the parts of the seal.

Another object of this invention is to provide a seal for a roll neck or the like which seals upon a vertical face by means of a washer having a ground and lapped radial sealing surface, said washer being so disposed within the seal that it may be readily removed for relapping or replacement.

Figure 1:
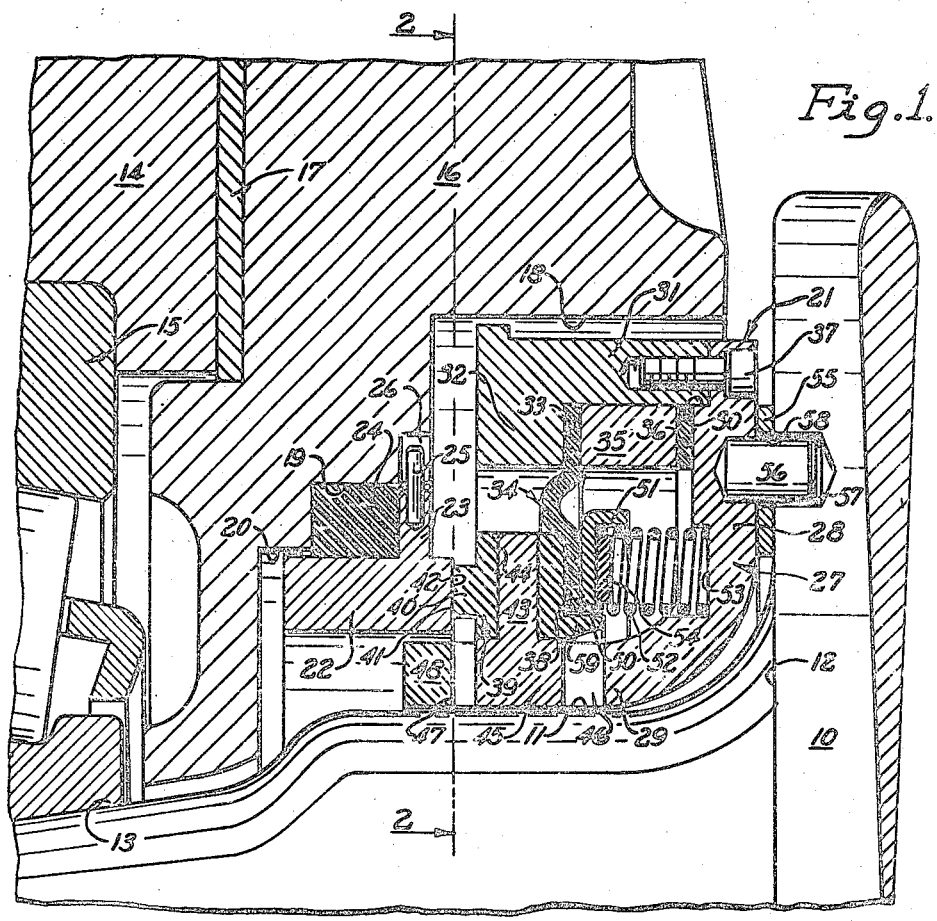
Figure 2:
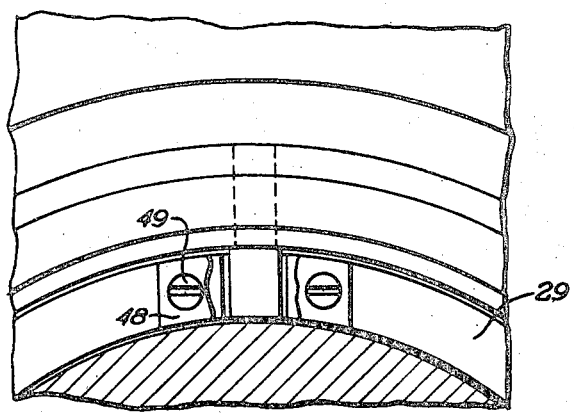

These and other objects and features of this invention will become apparent from the following detailed description when taken together with the accompanying drawings, in which Fig. 1 is a fragmentary radial cross-section through a seal embodying this invention and the portions of the roll neck and bearing chock associated therewith; and Fig. 2 is a fragmentary elevation of the seal of Fig. 1 taken along line 2—2 of Fig. 1.

Referring now to the drawings for a detailed description of the invention, the roll of a rolling mill is shown at 10 and has a neck portion 11 extending from a shoulder 12 on the roll and a tapered section 13 extending from the neck portion 11. The roll is supported from a bearing chock 14 by a suitable anti-friction bearing 15 which is pressed upon the tapered region 13 of the roll. Bearing 15 is partly protected by a coverplate 16 which is spaced from chock 14 by a gasket 17 and is supported from the chock by suitable fastening means such as bolts or the like (not shown).

Coverplate 16 has progressively smaller concentric recesses 18, 19 and 20 formed therein, the recesses opening on the right-hand side of the plate. The seal proper is shown at 21 and is in general disposed within recess 18. Said seal 21 is the rotary part of the seal and the stationary part is shown at 22 and comprises a ring of suitable material such as cast iron having a radially extending flange 23 located a short distance from

2 the right-hand end (Fig. 1) of the ring so as to define with recess 19 a rectangular space. In said space is compressed a ring 24 of resilient deformable material such as rubber, either natural or synthetic or a combination of the two, or a fibrous material which expands slightly when exposed to oil or other lubricant. The resilient ring 24 acts as a fluid-tight seal between plate 16 and ring 22 and also permits the ring 22 to change its position slightly relative to plate 16 to accommodate any slight weaving of the seal 21 with respect to plate 16 without destroying the seal between ring 22 and seal 21. Ring 22 is prevented from rotating relative to plate 16 by means of one or more pins 25 extending into slots 26 in plate 16 which do not interfere with the installation of ring 22 in plate 16.

The seal proper 21 is comprised of a rigid support 27 which is L-shaped in radial cross-section so as to have a radially extending portion 28 and an axially extending portion 29. The radially extending portion 28 is provided with a shoulder 30 which has a close fit with the interior of a flanged cylindrical ring 31, the flange being shown at 32. Adjacent flange 32 is the outer peripheral region 33 of an annular diaphragm 34, the diaphragm being made of flexible resilient material such as rubber, either natural or synthetic or a combination of the two, or a fabric impregnated with a coating of flexible material which is impervious to the fluid to be sealed so that the fabric is substantially fluid-tight. A spacer ring 35 is mounted within ring 31 with a relatively close fit so that spacer ring 35 is centered relative to the seal by means of ring 31. The left-hand end (Fig. 1) of spacer ring 35 abuts on the outer peripheral region 33 of diaphragm 34 and the right-hand end of spacer ring 35 abuts on a gasket 36 which spaces ring 35 from the radial portion 28 of the support 27. A plurality of screws 37 is utilized to draw up the ring 31, the outer peripheral region 33 of diaphragm 34, spacer ring 35 and gasket 36 against the radial portion 28 of support 27 so that a fluid-tight seal is effected between diaphragm 34 and support 27.

The inner region 38 of diaphragm 34 abuts on the back of a sealing washer 39, the washer 39 being mounted on the axially extending portion 29 of support 27. Said washer 39 may be made of a low friction material which is predominately phenolformaldehyde or other thermosetting resin and may be reinforced by layers of cotton or duck cloth for high impact resistance. Washer 39 is formed with a nose 40 extending axially to the left as shown in Fig. 1 and having a ground and lapped radially disposed surface 41 which has a fluid-tight running fit with a similarly ground and lapped radially disposed surface 42 on ring 22.

Washer 39 is held against rotation relative to support 27 by means of a plurality of pins 43 press-fitted into drilled openings 44 in washer 39 and provided with square-sided ends 45 (Figs. 1 and 2) extending radially inwardly into slots 46 formed in the axially extending portions 29 of support 27. Said slots 46 extend to the left as viewed in Fig. 1 to the left-hand edge 47 of support 27. The slots are closed by individual straps 48 (Fig. 2) suitably fastened to support 27 by screws 49. Alternatively, these slots may be closed by a continuous ring of material (not shown) in those cases where a large number of pins is used.

The inner region 38 of diaphragm 34 is held against washer 39 by a rigid ferrule or washer 50 which may be made of brass, stainless steel or other metal and preferably formed with a flange 51 for rigidity. Washer 39 is provided with an axially extending flange 59 which serves to center washer 50 and diaphragm 34 with respect to washer 39. A plurality of helical springs 52 is compressed between support 27 and ferrule 50 thereby providing an axial force which compresses the inner peripheral region 28 of diaphragm 34 against washer 39 and also holds washer 39 against the stationary ring 22. In order properly to locate springs 52 relative to support 27 and ferrule 50, recesses 53 are formed in support 27 and discs 54 are welded or cemented upon ferrule 50, the recesses 53 being large enough to receive springs 52 and the discs 54 being small enough to fit into the springs. The discs 54 are preferably made with a tight fit within springs 52 so that when the seal is assembled the springs may be pressed over the discs 54 and will remain in place while the ferrule and springs are mounted in support 27.

The axially extending portion 29 of support 27 has a loose fit with respect to neck 11 so that the seal may be readily installed upon or removed from the neck. A fluid-tight seal is effected between support 27 and shoulder 12 by means of a gasket 55. Support 27 is provided with one or more pins 56 which extend into openings 57 in shoulder 12 and serve to prevent relative rotation between support 27 and the roll. Gasket 55 is provided with openings 58 through which the pins 56 extend, said pins 56 serving to center the gasket 55 properly with respect to roll 10.

It will be apparent that the chock can be removed without in any way disturbing seal 21 and that seal 21 may likewise be readily removed from the roll when the roll is to be dressed without necessitating the destruction of any part thereof. The stationary ring 22 may be removed without difficulty from the plate 16 for relapping or replacement, whichever is necessary, and after seal 21 is removed from roll 10 the sealing washer 29 may similarly be removed for relapping or replacement without destroying the remainder of the seal. The seal 21 is handled as a unit and can be quickly replaced if necessary.

Although this invention has been described with reference to its adaptation to rolling mills, it can be used on any large diameter installation. If modified to utilize stampings instead of machined or cast parts, it can be used on small diameter installations with equal facility.

It is understood therefore that the foregoing description is illustrative of preferred embodiments of this invention and that the scope of the invention is not to be limited thereto, but is to be determined by the appended claims.

What is claimed is:

1. In a rotary seal having a washer with a radially disposed sealing surface thereon and a rigid support for the washer having an L-shaped radial cross-section, means for effecting a flexible fluid-tight seal between the washer and support comprising an apertured diaphragm having its inner peripheral region in contact with the washer, a cylinder surrounding the washer and spaced radially therefrom, said cylinder having an inwardly extending flange in contact with the one side of the outer peripheral region of the diaphragm, a spacer ring nested within the cylinder between the flange and support and contacting the other side of the outer peripheral region of the diaphragm, a gasket located between the spacer ring and support, means for drawing the flanged ring against the support to compress the diaphragm, spacer ring and gasket between the flange and support thereby to effect a fluid-tight seal between the outer peripheral region of the diaphragm and support, and means for compressing the inner peripheral region against the washer to effect a fluid-tight seal between the washer and diaphragm.

2. In a rotary seal, the combination described in claim 1, said washer having an axially extending flange passing through the aperture in the diaphragm and said means for compressing the inner peripheral region against the washer comprising a washer supported on said flange and resilient means compressed between the washer and support.

3. In a rotary seal, the combination described in claim 1, said support having open-ended slots in the vicinity of the washer, lugs on said washer extending into said slots to prevent relative rotation between the washer and support, and a ring disposed across the open ends of the slots to lock the washer in the support.

4. In a rotary seal, the combination described in claim 1, said washer being made of a thermosetting resin taken from the class consisting of phenol-formaldehyde, urea-formaldehyde and melamine, said support having slots in the vicinity of the washer, and lugs on said washer, said lugs comprising metal pins embedded in the washer and having substantially square heads extending into the slots.

5. In a rotary seal for effecting a fluid-tight seal between a shoulder on a roll neck and a chock therefor, the combination described in claim 1, said support for the seal fitting loosely on the roll neck, a plurality of pins retained in the support and extending axially toward the shoulder of the roll, openings in the shoulder into which the pins pass and a gasket inserted between the shoulder and support and positioned on the shoulder by the pins.

SHIRREL A. HASTINGS.
CHARLES F. VOYTECH.

REFERENCES CITED

The following references are of record in the file of this patent:

UNITED STATES PATENTS

| Number | Name | Date |
|---|---|---|
| 1,826,212 | Gremminger | Oct. 6, 1931 |
| 2,328,160 | Marvin | Aug. 31, 1943 |